United States Patent [19]
Lange

[11] 3,719,034
[45] Mar. 6, 1973

[54] HARVESTER SWEEPER
[72] Inventor: Roger J. Lange, R. R. 1, Brockton, Ill. 61917
[22] Filed: Sept. 8, 1970
[21] Appl. No.: 70,307

[52] U.S. Cl. .......................56/119, 15/80, 56/364, 198/173
[51] Int. Cl. .............................A01d 45/02
[58] Field of Search........56/16.5, 119, 345, 350, 364; 15/80; 198/173, 190

[56] References Cited

UNITED STATES PATENTS

| 3,209,526 | 10/1965 | Morrow | 56/119 X |
| 2,390,419 | 12/1945 | Brown et al. | 56/364 UX |
| 3,331,196 | 7/1967 | Grant | 56/98 X |
| 3,584,444 | 6/1971 | Sammann | 56/119 |
| 3,096,604 | 7/1963 | Baker et al. | 56/119 X |
| 3,572,018 | 3/1971 | Broussard | 56/119 |
| 1,780,472 | 11/1930 | Gilger | 56/364 |
| 3,295,302 | 1/1967 | Lee | 56/364 |

Primary Examiner—Russell R. Kinsey
Assistant Examiner—J. A. Oliff
Attorney—Woodard, Weikart, Emhardt & Naughton

[57] ABSTRACT

A sweeping device for incorporation into a harvester to pick ears of corn off the ground. Rows of flexible fingers are attached to bars supported between endless chains. Sprockets drive the chains thereby forcing the fingers across the ground and through slotted support plates to a shucking mechanism. Slotted wrap around plates are attached to the front of the harvester trapping the ears of corn as they are lifted off the ground by the fingers.

5 Claims, 5 Drawing Figures

INVENTOR
ROGER J. LANGE
BY
Woodard, Weikart, Emhardt & Naughton
ATTORNEYS

INVENTOR
Roger J. Lange

BY

Woodard, Weikart Emhardt & Naughton
ATTORNEYS

3,719,034

HARVESTER SWEEPER

BACKGROUND OF THE INVENTION

1. Field of the Invention

This is a sweeping device for picking up ears of corn off the ground.

2. Description of the Prior Art

Corn harvesters, such as the one shown in the U.S. Pat. No. 2,961,820 issued to Hadley, allow the farmer to quickly gather the corn from the field. Similar harvesters and lifters are shown in the following U.S. Pat. Nos.: 2,835,097 issued to Sullivan, 2,933,876 issued to Davin and 3,438,184 issued to Jellis.

The conventional corn harvester will strip the ears of corn from the stalk and convey the ears to a shucking mechanism. These same harvesters will not however pick up the separate ears of corn which have fallen off the stalk to the ground. In addition, these harvesters will generally not pick up a stalk which is lying flat on the ground. As a result, many ears of corn are not harvested since they are lying on the ground.

From the above background, it can be seen that there is a need for a device for picking up the ears of corn lying on the ground which are not collected by a conventional harvester. The device should be capable of being incorporated into existing harvesters so that the farmer will be able to harvest all of the corn in one pass over the rows of corn.

SUMMARY OF THE INVENTION

This invention is a sweeping device which may be used to harvest rows of corn. Rows of flexible rubber fingers are fixedly attached to C-shaped bars having hooks at either end engaging continuous roller chains. Sprockets fixedly mounted to rotating shafts drive the chains thereby forcing the fingers across the ground and up to a shucking mechanism. The fingers project through slotted plates supporting the ears of corn as they are conveyed to the shucking mechanism. Slotted front plates are attached to the front of the harvester engaging the fingers as they lift the ears of corn off of the ground. Rubber bumpers are attached to the bottoms of the front plates. An alternate embodiment of the present invention is used to pick up debris along highways.

It is an object of the present invention to provide a device for picking up the ears of corn lying on the ground which are not collected by a conventional harvester.

It is a further object to provide a device as previously described and which may be incorporated into existing harvesters.

Yet another object of the present invention is to provide a sweeping device having fingers for picking up debris from and along highways.

Related objects and advantages of the present invention will be apparent from the following specification.

BRIEF DESCRIPTION OF THE DRAWING

FIG. 3 is a top perspective view of the three bottom support plates of FIG. 1 with grooves for the finger like elements to project through.

DESCRIPTION OF THE PREFERRED EMBODIMENTS

Figure 1:
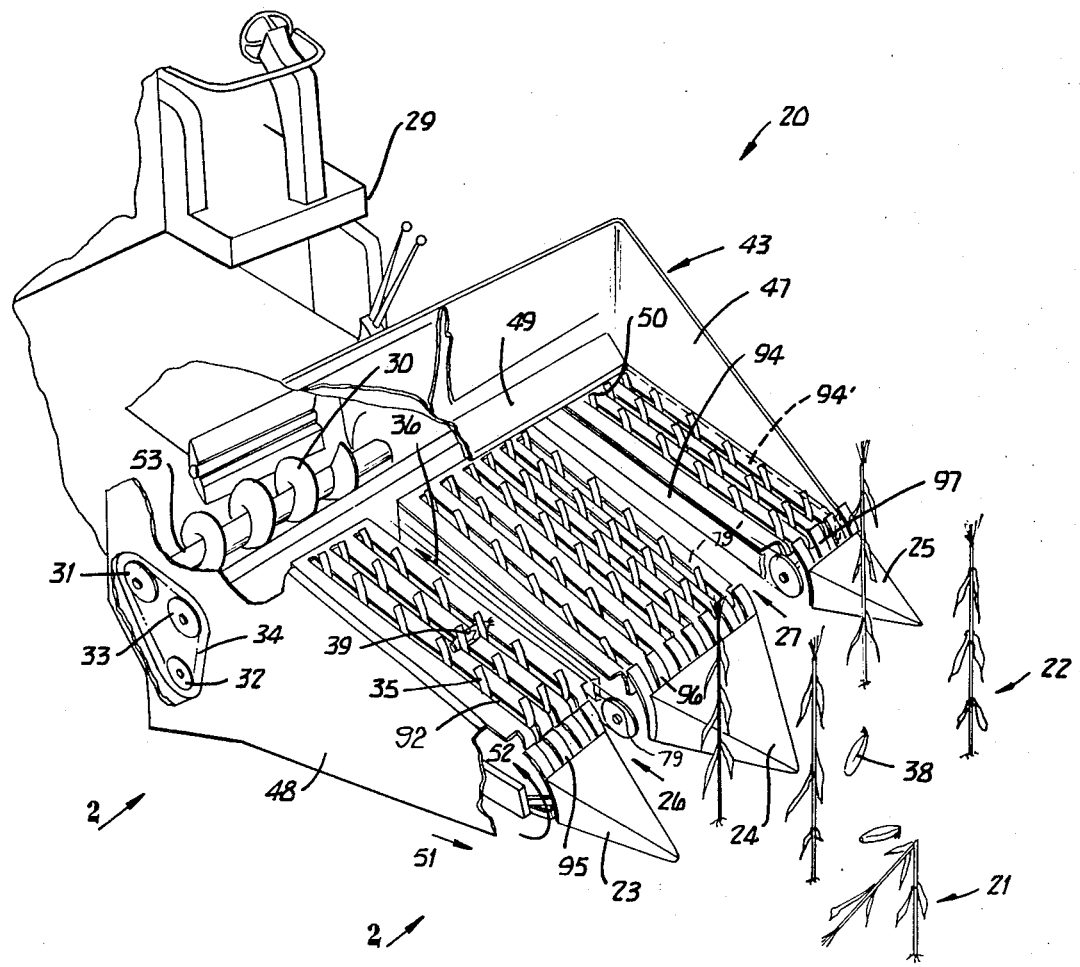
FIG. 1 is a fragmentary perspective view of the front shovel shaped portion of a corn picker incorporating the present invention.

For the purposes of promoting an understanding of the principles of the invention, reference will now be made to the drawing and the embodiments of the invention will be described in the following specification. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is illustrated the front shovel shaped portion 43 of a corn picker 20 for harvesting a corn crop. Shovel shaped portion 43 is fixedly fastened by welding or other suitable means to the main frame 29 of corn picker 20 and has two side walls 47 and 48 fixedly fastened by screws or welds, not shown, to the back wall 49. Snouts 23 and 24 are spaced apart forming opening 26 for receiving a row of corn 21 whereas snouts 24 and 25 are spaced apart for forming opening 27 for receiving row of corn 22. Many more snouts may be added to the front of the corn picker depending on the desired number of rows of corn to be harvested simultaneously.

As corn picker 20 is propelled across the field of corn, the rows enter the openings between the snouts and move towards rotating shucking mechanism 30 partially shown in the fragmented portion of FIG. 1. The bottom wall of shovel shaped portion 43 is inclined from the snouts up to the shucking mechanism so that the ears of corn may be stripped from the stalks eventually passing through opening 50 between back wall 49 and the bottom wall of the shovel shaped portion 43. Located along and adjacent either side of opening 26 and 27 are members 41 (FIG. 4) which catch the stalks of corn and strip the ears of corn from the stalk. Members 41 have been omitted from FIG. 1 for sake of clarity. As members 41 move up the inclined bottom wall of shovel shaped portion 43 towards shucking mechanism 30 the ears of corn are stripped from the stalk. Members 41 are fastened to chains and are moved towards the shucking mechanism 30. The shucking mechanism 30 is rotatably mounted and has a sprocket 31 (FIG. 1) engaging a continuous roller chain 34. A motor, not shown, is mounted to main frame 29 and drives sprocket 32 which also engages roller chain 34. As sprocket 32 is rotated, chain 34 also rotates causing sprocket 31 and shucking mechanism 30 to rotate.

Shaft 55 (FIG. 4) extends freely through support bars 63 and 79 and has sprockets 64 and 80 fixedly mounted thereon respectively adjacent bars 63 and 79 for driving the conventional mechanism for stripping the ears of corn from the stalk. Bars 48', 63 and 79 are attached to main frame 29 by welding or other suitable means. Worm gears 65 and 81 respectively engage sprockets 64 and 80 having small diametered chain gears 66 and 82 mounted to their tops for respectively driving chains 42 and 83. Chains 42 and 83 respectively engage chain gears 68 and 85 which are rotatably mounted by suitable brackets fastened to bars 63 and 79. The stripping elements 41 are fixedly mounted to chains 42 and 83 on either side of opening 26 for receiving stalks. Worm gears 65 and 81 are mounted to rods not shown which are secured to bars 63 and 79. The above described corn picker is conventional and is commercially sold by the John Deere and Company of Moline, Illinois under Model Corn Special 45.

In many cases, ears of corn 38 are lying on the ground. These ears are generally not picked up by a corn picker since the stalks must be standing up off the ground in order to pass through the openings formed between the snouts. The present invention has fingerlike elements 35 moveable across the ground in the direction of arrow 51, brushing against the plates attached to the back of the snouts in the direction of arrow 52 and up through the slots 92 in the bottom wall of shovel shaped portion 43 in the direction of arrow 36. This sweeping action allows the corn picker to sweep the ground and pick up ears of corn lying on the ground thereby increasing the efficiency of the corn picker.

Figure 2:
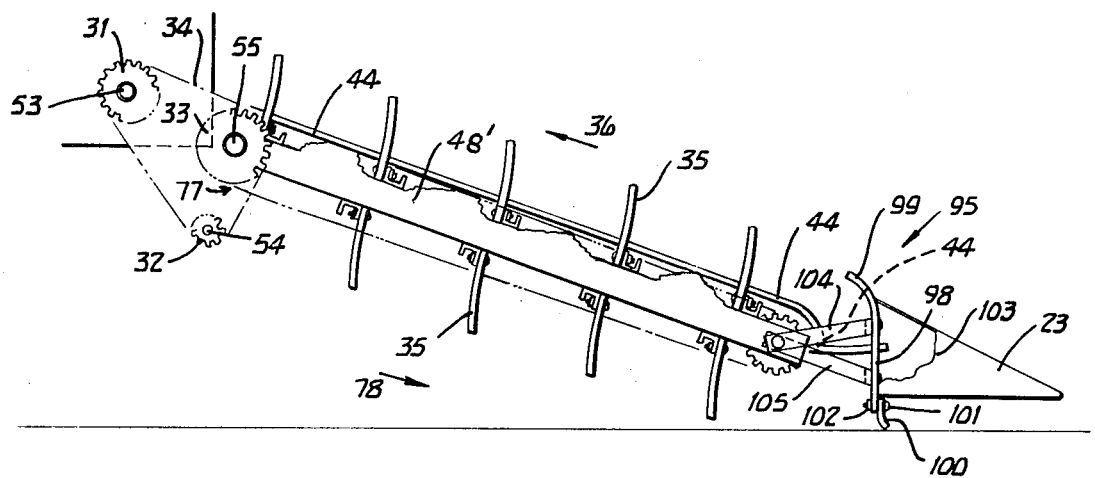
FIG. 2 is a fragmentary side view of the corn picker of FIG. 1 with side wall 48 removed for particularly showing the driving mechanism and is viewed in the direction of arrows 2—2 of FIG. 1.

FIG. 2 is a side view of the corn picker of FIG. 1 with side wall 48 removed to show the driving mechanism. As previously mentioned, it is the practice to drive shucking mechanism 30 by a sprocket and chain mechanism. Thus, in FIG. 2, sprocket 31 is fixedly mounted to the end of shaft 53 of shucking mechanism 30. An endless roller chain 34 engages sprockets 31 and 32, the latter sprocket being fixedly mounted to the output motor shaft 54 used to drive chain 34. A third sprocket 33 engages continuous roller chain 34 transmitting power to shaft 55 for moving fingerlike elements 35.

Figure 4:
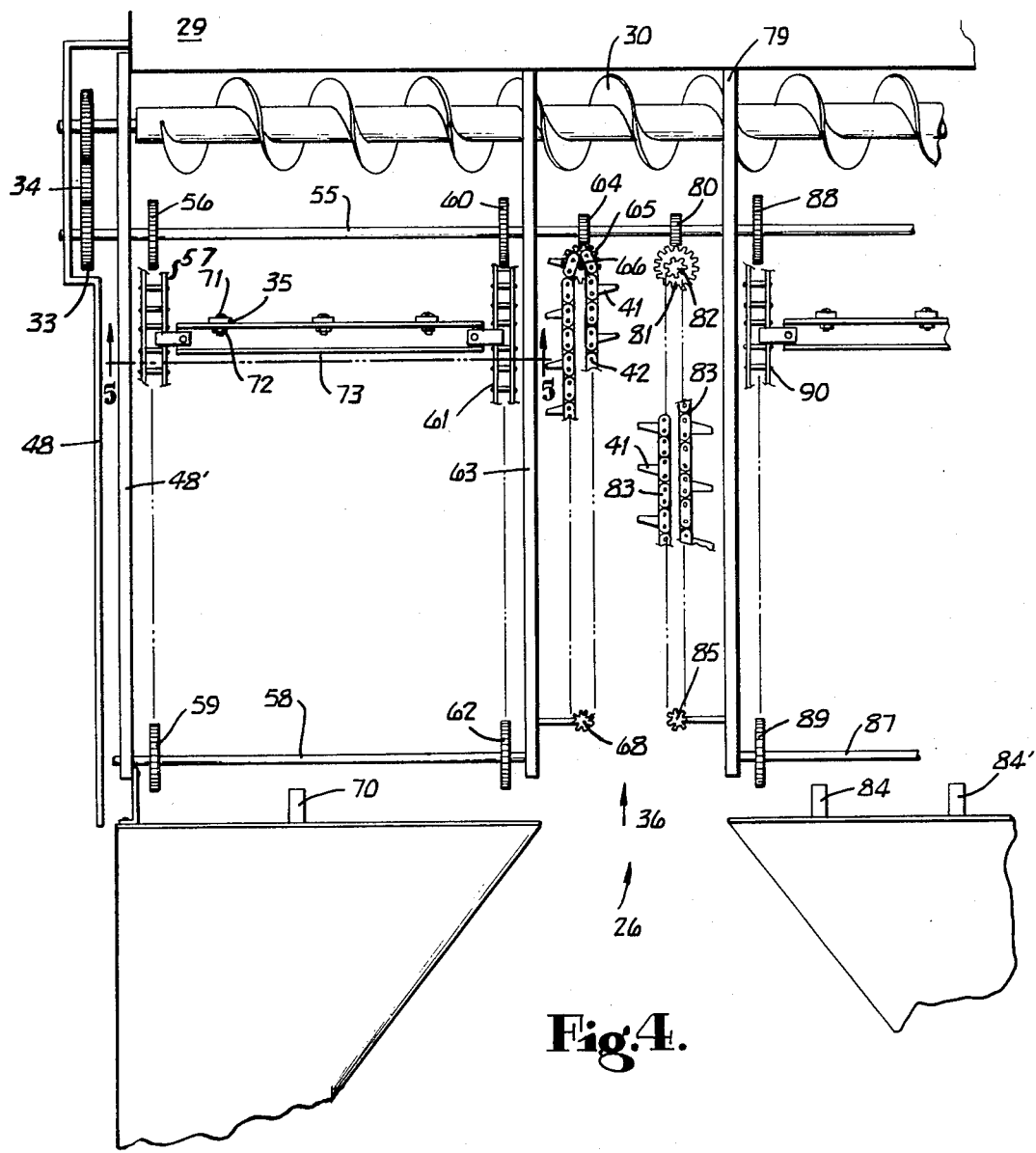
FIG. 4 is a fragmentary view looking down into the corn picker shown in FIG. 1 with the support plates of FIG. 3 removed.

FIG. 4 is a fragmentary top view of the corn picker of FIG. 1 with the bottom wall of shovel shaped portion 43 removed. Shaft 55 is rotatably mounted to the top of side walls 48 and 47 (FIG. 1) and has sprocket 33 fixedly mounted to its end engaging continuous roller chain 34. Also fixedly mounted to shaft 55 adjacent the inside of support bar 48' is sprocket 56 which engages continuous roller chain 57. Rotatably mounted to the bottom of support bars 48' and 63 is shaft 58 which carries sprocket 59. Continuous roller chain 57 extends around and engages sprockets 56 and 59. Shaft 55 extends freely through support bar 63 and has sprocket 60 fixedly mounted to it adjacent bar 63. Mounted also adjacent to support bar 63 on shaft 58 is sprocket 62. Continuous roller chain 61 extends completely around and engages sprockets 60 and 62.

FIG. 4 shows only the left side of the corn picker of FIG. 1. It is understood, however, that the following description also applies to the right side of the corn picker. Likewise, many of the C-shaped bars 73 have been omitted from FIG. 4 for sake of clarity. One of the C-shaped bars 73 will now be described, it being understood that a similar description applies to the other C-shaped bars behind snouts 23, 24, and 25.

Figure 5:
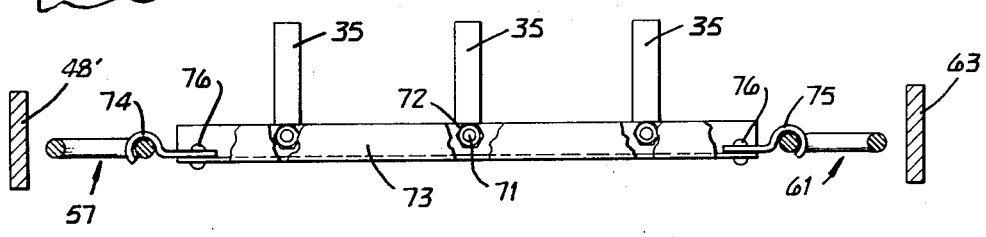
FIG. 5 is an enlarged view taken along the line 5—5 of FIG. 4 and viewed in the direction of the arrows.

Fingerlike elements 35 are fixedly fastened by bolts 71 and nuts 72 to C-shaped bar 73 which is secured to chains 57 and 61 at either end. Referring to FIG. 5, bar 73 has hooks 74 and 75 firmly secured to both ends by rivets 76. Hooks 74 and 75 have a grasping portion extending around one of the lengths of chains 57 and 61. Thus, as shaft 55 is driven by sprocket 33 in the direction of arrow 77 (FIG. 2), the C-shaped bars with fingerlike elements 35 will move up towards shucking mechanism 30 in the direction of arrow 36 and back down in the direction of arrow 78.

The driving mechanism described above for the fingerlike elements 35 behind snout 23 is identical to that for driving the fingerlike elements 35 behind snouts 24 and 25. Thus, sprockets 88 and 89 are fixedly mounted adjacent support bars 79 to shafts 55 and 87 with the continuous roller chain 90 having C-shaped bars 73 mounted thereto. In the embodiment of FIG. 1, six rows of elements 35 are mounted behind snout 24 whereas only three rows of elements 35 are mounted behind each of snouts 23 and 25. Support bars 79 and 79' (FIG. 1) are welded to frame 29 as are support bars 94 and 94'.

Figure 3:
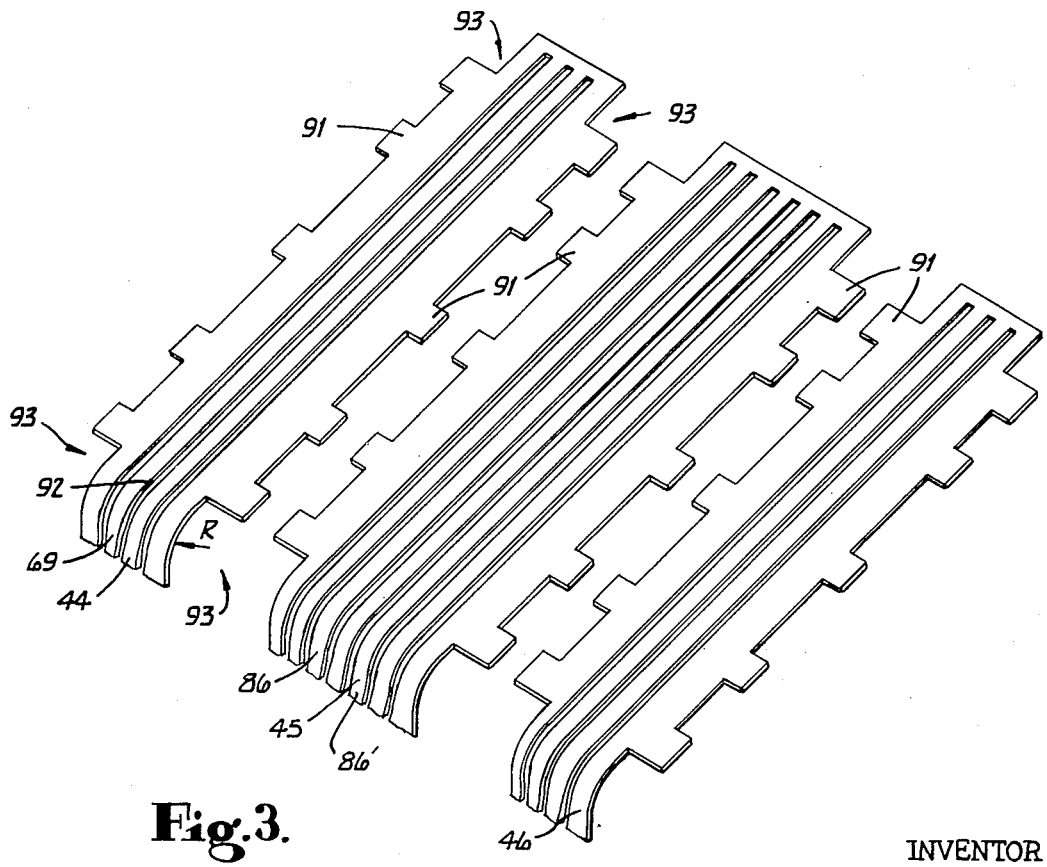

The bottom wall of shovel-like portion 53 was removed from FIG. 4 in order to show the driving mechanism more clearly. A top perspective view of the bottom wall is shown in FIG. 3. Actually the bottom wall is composed of three separate support plates 44, 45 and 46. Inclined support plate 44 mounts to and between support bars 48' and 63. Plate 44 has tabs 91 on either side which are welded to bars 48' and 63. The four corners of plate 44 have cutouts 93 to prevent interference between the plate and sprockets 56, 59, 60 and 62. Three slots 92 are provided for elements 35 to project through. Plate 46 is identical with plate 44 and is welded to bar 94 and 94'. (FIG. 1). Plate 46 also has three slots 92 and cutouts 93. Plate 45 is configured identically with plates 44 and 46 with the exception that plate 45 is wider since it has six slots for receiving six rows of fingerlike elements 35. Plate 45 fits behind snout 24 and has tabs welded to support bars 79 and 79'. The lower portion of plate 44 is radiused, as indicated by radius R, so that the plate may extend partially over and around shaft 58 as shown in FIG. 2. Likewise, the lower portion of plates 45 and 46 are also radiused.

Referring to FIG. 1, snouts 23, 24 and 25 are welded to wrap around plates 95, 96 and 97. In FIG. 2, plate 95 has a vertical portion 98 integrally joined to curved portion 99. Snout 23 is welded to vertical portion 98. Mounted beneath snout 23 is rubber bumper 100 extending the length of vertical portion 98. The bumper is sufficiently flexible to allow ears of corn to pass to fingers 35. Bumper 100 is fastened to plate 95 by bolts 101 and nuts 102. Plate 95 is slotted for fingerlike elements 35 to project through. The slots in plate 95 extend from the top of curved portion 99 to approximately midway between the bottom of portion 98 and the top of portion 99. Fragmented section 103 illustrates that snout 23 is hollow for elements 35 to project therein. Snout 23 and plate 95 are fixedly mounted to the lower end of support bar 48' by two angle arms. In FIG. 2, angle arms 104 and 105 are welded to vertical portion 98 and support bar 48'. In addition, snout 23 and plate 95 have an arm 70 (FIG. 4) welded to member 69 of plate 44 (FIG. 2). Snout 25 and plate 97 are mounted to their respective support bar and plate in a manner identical with the mounting for snout 23 and plate 95. Snout 24 and plate 96 are fixedly mounted to plate 45 by arms 84 and 84' (FIG. 4) being welded to members 86 and 86' (FIG. 2). Rubber bumpers are mounted to the bottoms of plates 96 and 97 in a manner identical as that to bumper 100 and plate 95.

Fingers 35 are made from a flexible rubber, such as that typically found in an automobile tire. As the fingers sweep through the slots provided in plates 95, 96 and 97 (FIG. 1), the fingers will lift any ears of corn resting on top of plates 95, 96 and 97 forcing the ears up toward mechanism 30 as illustrated by ear of corn 39.

Another use of the present invention is to sweep up debris on and along highways. Several minor changes to the structure illustrated in the drawing should be accomplished to modify the structure for highway use. Snouts 23, 24 and 25 are not required nor are openings 26 and 27. Likewise, the members 41 are not required. Plates 95, 96 and 97 are joined in one integral piece and rows of fingers extend completely behind the plates.

Many variations of the present invention are contemplated and included in the present invention. For example, many snouts may be added to the front of portion 43 depending on the number of rows of corn to be harvested.

It will be evident from the above description that the present invention provides a device for picking up ears of corn lying on the ground which are not collected by a conventional harvester. It will also be evident that the device may be incorporated into existing harvesters. In addition, it will be evident that the sweeping device may be used to pick up debris along and on a highway.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are also desired to be protected.

The invention claimed is:
1. In a vehicle having a shovel-shaped forward end with an upwardly inclined bottom wall with a downwardly curved bottom end portion and first slots extending through said portion and up said wall, snouts mounted to said end and spaced apart forming openings to receive upstanding corn stalks, stripping means mounted on said end on both sides of each of said openings for stripping ears of corn from said stalks passing through said openings, guide means mounted on said end operable to guide said ears to a collector subsequent to the stripping thereof; wherein the improvement comprises:
said snouts each having a wrap around plate mounted on the rearward end thereof, each plate being spaced sufficiently outward of said bottom end portion to allow ears of corn to pass therebetween, each plate having a top portion with second slots curving in the same direction as said bottom end;
flexible finger-shaped elements;
holding means having said elements fixedly attached thereto; and,
driving means connected to said holding means for forcing said elements across the ground and through said first slots and said plate forcing ears of corn on the ground up between said bottom end portion and said plate and operable to force said elements through said second slots to lift ears of corn atop said plate onto said bottom wall.
2. The vehicle of claim 1 wherein:
said bottom wall is separated into at least three separate pieces, each of said pieces have said first slots therein receiving said elements;
said vehicle is a corn harvester and said snouts are hollow and are fixedly mounted each in front of said pieces, said elements project through said pieces and into said snouts.
3. The vehicle of claim 2 additionally comprising:
support means fixedly attached to said vehicle extending downward parallel with said bottom wall, said support means has said plate fixedly mounted thereto in spaced relation to said bottom wall;
a rubber bumper fixedly attached to the bottom of said plate and extending downward to the ground.
4. The vehicle of claim 3 wherein:
said support means are rigid bars cantilevered from said vehicle.
5. The vehicle of claim 4 wherein:
said second slots extend from the top end of each plate to midway between the ends of said plate.

* * * * *